(12) United States Patent
Liu et al.

(10) Patent No.: US 12,641,170 B2
(45) Date of Patent: May 26, 2026

(54) ELECTRONIC DEVICE AND CAMERA THEREOF

(71) Applicant: VIVO MOBILE COMMUNICATION CO., LTD., Guangdong (CN)

(72) Inventors: Chaofeng Liu, Chang'an (CN); Shihu Zhang, Chang'an (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 130 days.

(21) Appl. No.: 18/647,610

(22) Filed: Apr. 26, 2024

(65) Prior Publication Data

US 2024/0275874 A1      Aug. 15, 2024

Related U.S. Application Data

(63) Continuation of application No. PCT/CN2022/126627, filed on Oct. 21, 2022.

(30) Foreign Application Priority Data

Oct. 28, 2021    (CN) .......................... 202111264826.5

(51) Int. Cl.
| | |
|---|---|
| *H04M 1/02* | (2006.01) |
| *H04N 23/51* | (2023.01) |
| *H04N 23/55* | (2023.01) |

(52) U.S. Cl.
CPC ....... *H04M 1/0264* (2013.01); *H04M 1/0283* (2013.01); *H04N 23/51* (2023.01); *H04N 23/55* (2023.01)

(58) Field of Classification Search
CPC .. H04M 1/0264; H04M 1/0283; H04N 23/51; H04N 23/55; H04N 23/53; G03B 17/02; G03B 17/565
See application file for complete search history.

(56) References Cited

U.S. PATENT DOCUMENTS

| | | | | | |
|---|---|---|---|---|---|
| 3,188,930 | A | * | 6/1965 | Roller | ...................... G02B 7/02 |
| | | | | | 396/529 |
| 11,258,951 | B2 | * | 2/2022 | Platner | ................. H04N 23/687 |

(Continued)

FOREIGN PATENT DOCUMENTS

| | | |
|---|---|---|
| CN | 204886938 U | 12/2015 |
| CN | 109862242 A | 6/2019 |

(Continued)

OTHER PUBLICATIONS

International Search Report related to Application No. PCT/CN2022/126627; reported on Jan. 10, 2023.

*Primary Examiner* — Padma Haliyur

(57) ABSTRACT

This application discloses an electronic device including: a camera including a base and a camera lens disposed at the top of the base; and a decorative ring including a frame body and a skirt, where the skirt is disposed on an outer wall of the frame body and extends from the frame body in a direction away from the frame body; a first through hole is provided in the frame body, the camera faces the first through hole, and at least part of the camera lens is located in the first through hole; and the skirt has an avoidance space, the avoidance space is disposed in relation to top corners of the base, and at least part of the top corner is disposed in the avoidance space.

8 Claims, 4 Drawing Sheets

(56) References Cited

U.S. PATENT DOCUMENTS

| | | | | |
|---|---|---|---|---|
| 2007/0248356 | A1* | 10/2007 | Toji ........................ | H04N 23/55 |
| | | | | 396/529 |
| 2013/0084061 | A1* | 4/2013 | Imafuji ................. | H04N 23/51 |
| | | | | 396/529 |
| 2014/0240857 | A1* | 8/2014 | Meng ...................... | G02B 7/02 |
| | | | | 359/827 |
| 2017/0351164 | A1* | 12/2017 | Kim ....................... | H04N 23/51 |
| 2019/0068767 | A1* | 2/2019 | Liu ..................... | H04M 1/0283 |
| 2020/0186630 | A1* | 6/2020 | Bao ..................... | H04M 1/0283 |
| 2022/0377162 | A1 | 11/2022 | Ma et al. | |

FOREIGN PATENT DOCUMENTS

| | | | |
|---|---|---|---|
| CN | 113489875 | A | 10/2021 |
| CN | 214480715 | U | 10/2021 |
| CN | 113810586 | A | 12/2021 |
| WO | 2021155767 | A1 | 8/2021 |

* cited by examiner

ELECTRONIC DEVICE AND CAMERA THEREOF

CROSS-REFERENCE TO RELATED APPLICATIONS

This application is a Bypass Continuation Applications of PCT International Application No. PCT/CN2022/126627 filed on Oct. 21, 2022, which claims priority to Chinese Patent Application No. 202111264826.5, filed in China on Oct. 28, 2021, which is incorporated herein by reference in its entirety.

TECHNICAL FIELD

This application pertains to the communication field, and specifically relates to an electronic device.

BACKGROUND

With the progress of science and technology, electronic devices (for example, mobile phones and tablet computers) have experienced significant progress. Electronic devices serve as powerful tools that greatly facilitate life and work of users. The camera function is a fundamental feature of electronic devices, which can satisfy user needs for shooting. Typically, the camera function is implemented through the camera module of electronic devices.

As the demand for the camera function of electronic devices continues to increase, the photosensitive chips of camera modules are growing larger, resulting in larger camera sizes that hinder the thinning of electronic devices.

SUMMARY

According to a first aspect, an embodiment of this application provides an electronic device including:

a camera, including a base and a camera lens disposed at the top of the base; and a decorative ring, including a frame body and a skirt, where the skirt is disposed on an outer wall of the frame body and extends from the frame body in a direction away from the frame body; a first through hole is provided in the frame body, the camera faces the first through hole, and at least part of the camera lens is located in the first through hole; and the skirt has an avoidance space, the avoidance space is disposed in relation to top corners of the base, and at least part of the top corner is disposed in the avoidance space.

Further, the skirt includes a plurality of strip edges, where the plurality of strip edges are spaced apart from each other, and two adjacent strip edges have the avoidance space.

Further, the electronic device further includes a cover plate. The cover plate includes a plate body and a mounting lug boss connected to the plate body, a second through hole is provided in the mounting lug boss, and the first through hole is in communication with the second through hole; and the decorative ring covers the mounting lug boss, and the mounting lug boss is sealingly connected to the top corner of the base through the avoidance space.

Further, the cover plate further includes a plurality of mounting notches provided between the mounting lug boss and the plate body, and the skirt is inserted into the mounting notches.

Further, the mounting lug boss is located on a side of the plate body close to the decorative ring; or a surface of the mounting lug boss close to the decorative ring is flush with a surface of the plate body close to the decorative ring.

Further, the base of the camera is of a rectangular body structure, four top corners of the base are each provided with a notch, and notch bases of the notches are connected to the bottom of the mounting lug boss.

Further, the electronic device further includes a motherboard support, where the motherboard support includes a support body and a sealing lug boss connected to the support body, a third through hole is provided in the sealing lug boss, and the third through hole is in communication with the second through hole; and the sealing lug boss is sandwiched between the mounting lug boss and each of the top corners of the base of the camera through a sealing member, and the notch bases of the notches are connected to the bottom of the sealing lug boss.

Further, the sealing member includes sealing foam.

Further, the electronic device further includes a battery cover, where the battery cover includes a cover body and a decorative hole that passes through the cover body; and the cover plate further includes a cover plate skirt extending outwardly from an edge of the plate body, the cover plate skirt is connected to an edge of the decorative hole, and the decorative ring is located in the decorative hole.

Further, the electronic device further includes a lens.

The decorative ring further includes a supporting table extending inwardly from the frame body to form the first through hole, and the supporting table carries the lens to allow the lens to cover a viewing angle of the camera lens.

BRIEF DESCRIPTION OF DRAWINGS

The foregoing and/or additional aspects and advantages of this application will become apparent and easily understood from the descriptions of embodiments taken in combination with the accompanying drawings.

Figure 1:
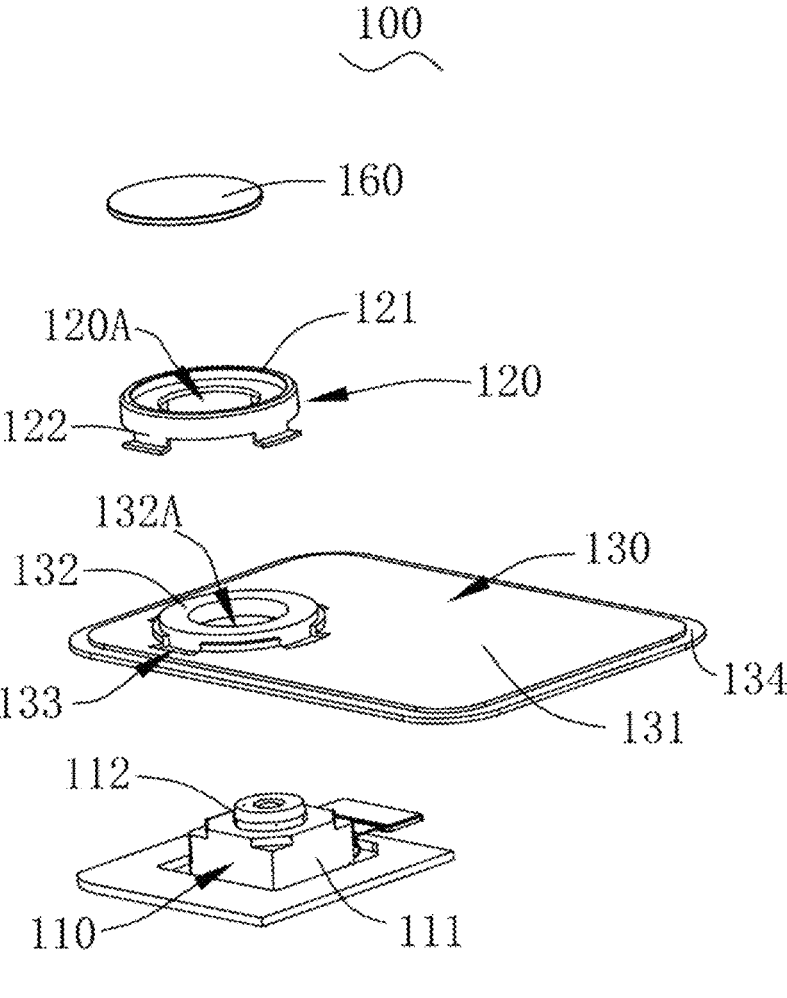
FIG. 1 is a schematic diagram of a partial stereoscopic structure in an embodiment of an electronic device according to this application.

Reference signs: 100. electronic device; 110. camera; 111. base; 112. camera lens; 120. decorative ring; 120A. first through hole; 121. frame body; 122. skirt; 1221. strip edge; 123. avoidance space; 124. supporting table; 130. cover plate; 131. plate body; 132. mounting lug boss; 132A. second through hole; 133. mounting notch; 134. cover plate skirt; 140. motherboard support; 141. support body; 142.

sealing lug boss; 150. battery cover; 151. cover body; 152. decorative hole; and 160. lens.

DESCRIPTION OF EMBODIMENTS

Embodiments of this application are described in detail below, and examples of the embodiments are shown in the accompanying drawings, where same or similar designations throughout indicate same or similar elements or elements having a same or similar function. Embodiments described below with reference to the accompanying drawings are examples and are used only for the purpose of explaining this application but are not construed as a limitation on this application. Based on embodiments in this application, all other embodiments obtained by persons of ordinary skill in the art without creative efforts fall within the protection scope of this application.

The terms "first" and "second" in the specification and claims of this application may expressly or impliedly include one or more of such features. In the descriptions of this application, "plurality" means two or more, unless otherwise specified. In addition, "and/or" in the specification and claims represents at least one of connected objects, and the character "/" generally indicates that the contextually associated objects have an "or" relationship.

In the descriptions of this application, it should be understood that the orientations or positional relationships indicated by the terms "center", "vertical", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships shown in the accompanying drawings, are merely intended to facilitate the descriptions of this application and simplify the descriptions, are not intended to indicate or imply that the apparatuses or components mentioned in this application must have specific orientations, or be constructed and operated for a specific orientation, and therefore shall not be construed as a limitation to this application.

In the descriptions of this application, it needs to be noted that, unless otherwise expressly provided and limited, the terms "mounting", "joint", and "connection" should be understood in a broad sense. For example, they may refer to a fixed connection, a detachable connection, or an integral connection; may refer to a mechanical connection or an electrical connection; and may refer to a direct connection, an indirect connection via an intermediate medium, or an internal communication between two elements. Persons of ordinary skill in the art can understand specific meanings of these terms in this application based on specific situations.

An electronic device 100 in some embodiments of this application is described below with reference to FIG. 1 and FIG. 2, and includes:

a camera 110 including a base 111 and a camera lens 112 disposed at the top of the base 111; and a decorative ring 120 including a frame body 121 and a skirt 122, where the skirt 122 is disposed on an outer wall of the frame body 121 and extends from the frame body 121 in a direction away from the frame body 121; a first through hole 120A is provided in the frame body 121, the camera 110 faces the first through hole 120A, and at least part of the camera lens 112 is located in the first through hole 120A; and the skirt 122 has an avoidance space 123, the avoidance space 123 is disposed in relation to top corners of the base 111, and at least part of the top corner is disposed in the avoidance space 123.

In embodiments of this application, the avoidance space 123 is designed on the skirt 122 of the decorative ring 120, and the top corners of the base 111 of the camera 110 are at least partially disposed in the avoidance space 123, so that a fitting height between the camera 110 and the decorative ring 120 can be reduced, and an internal space of the electronic device 100 can be optimized, thereby facilitating the thinning of the electronic device 100.

The camera 110 includes the base 111 for fixing the camera lens 112, and the top of the base 111 is connected to the bottom of the camera lens 112. The base 111 and the camera lens 112 may be fixedly connected. To be specific, the camera lens 112 is not able to swing relative to the base 111, and a viewing angle of the camera lens 112 is fixed in a case that the base 111 is fixed. Alternatively, the base 111 and the camera lens 112 may be movably connected. In this case, the camera lens 112 is able to swing relative to the base 111, and a viewing direction of the camera lens 112 can be adjusted in a case that the base 111 is fixed.

The first through hole 120A is provided in the frame body 121 of the decorative ring 120, at least part of the camera lens 112 is located in the first through hole 120A, and the camera lens 112 takes a view of the environment outside the electronic device 100 through the first through hole 120A. In the embodiments of this application, the frame body 121 may be an annular frame body.

In some embodiments, the frame body 121 of the decorative ring 120 surrounds the camera lens 112 on a housing of the electronic device 100 so as to protect the camera lens 112 and improve aesthetics of the electronic device.

There may be a plurality of avoidance spaces 123 on the skirt 122 of the decorative ring 120, and a number of avoidance spaces 123 is greater than or equal to the number of top corners of the base 111 of the camera 110. The base 111 may be a triangular prism structure, that is, the base 111 has three top corners. In this case, there are at least three avoidance spaces 123 on the skirt 122. Alternatively, the base 111 may be a quadrangular prism structure, that is, the base 111 has four top corners. In this case, there are at least four avoidance spaces 123 on the skirt 122. Alternatively, the base 111 may be a hexagonal prism structure, that is, the base 111 has six top corners. In this case, there are at least six avoidance spaces 123 on the skirt 122.

For example, the base 111 of the camera 110 is a rectangular frame structure (that is, a positive quadrangular prism structure), and the top corners of the base 111 are four corners on a side of the base 111 close to the decorative ring 120. The frame body 121 of the decorative ring 120 may be an annular structure, the skirt of the decorative ring 120 has four avoidance spaces, and the four top corners of the base 111 are disposed one by one correspondingly in the four avoidance spaces 123.

Figure 2:
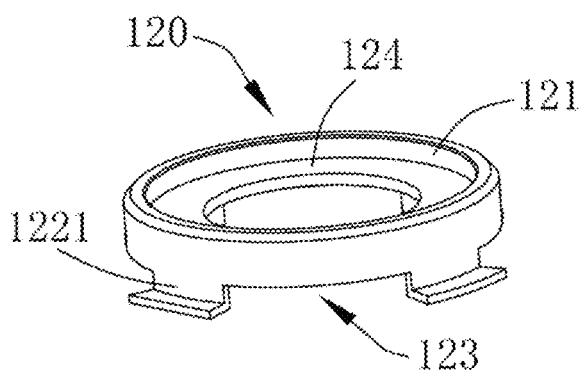
FIG. 2 is a schematic diagram of a structure of a decorative ring in an embodiment of an electronic device according to this application.

Further, as shown in FIG. 2, the skirt 122 includes a plurality of strip edges 1221, where the plurality of strip edges 1221 are spaced apart from each other, and two adjacent strip edges 1221 have the avoidance space 123.

One end of the strip edge 1221 is connected to the bottom of the frame body 121 and the other end extends towards the base 111 of the camera 110. The decorative ring 120 can be matched to the top corners of the base 111 of the camera 110 with the help of the strip edges 1221 at a smaller outer diameter size.

A plurality of strip edges 1221 are spaced apart from each other to partition a plurality of avoidance spaces 123, meaning that the strip edges 1221 and the avoidance spaces 123 are arranged alternately. The strip edges 1221 and the top corners of the base 111 of the camera 110 are disposed in a staggered manner, and the avoidance spaces 123 are provided correspondingly to the top corners of the base 111 of the camera 110. A width of the avoidance space 123 may be greater than a width of the strip edge 1221 or may be equal to the width of the strip edge 1221. A wider avoidance space 123 facilitates the insertion of the top corner of the base 111 of the camera 110 into the avoidance space 123.

Further, the electronic device 100 further includes a cover plate 130. The cover plate 130 includes a plate body 131 and a mounting lug boss 132 connected to the plate body 131, a second through hole 132A is provided in the mounting lug boss 132, and the first through hole 120A is in communication with the second through hole 132A. The decorative ring 120 covers the mounting lug boss 132, and the mounting lug boss 132 is sealingly connected to the top corner of the base 111 through the avoidance space 123.

The skirt 122 is formed by extending from the bottom of the frame body 121, and is connected to the cover plate 130 to mount the frame body 121 on the cover plate 130. The decorative ring 120 can be matched to a side of the mounting lug boss 132 with the help of the skirt 122 in a case that the frame body 121 maintains a small outer diameter size.

Figure 3:
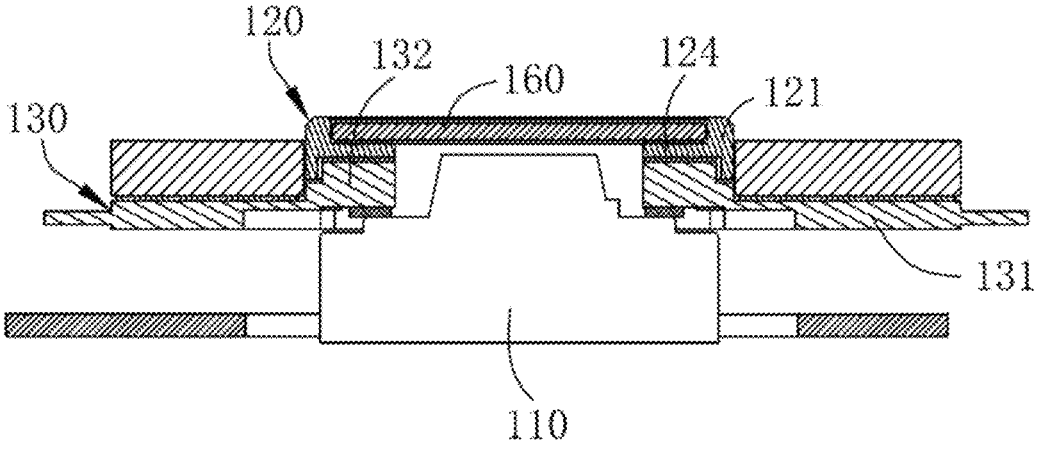
FIG. 3 is a partial sectional view of an embodiment of an electronic device according to this application.

As shown in FIG. 3, a sealing member may be provided between the mounting lug boss 132 and the decorative ring 120, so that the mounting lug boss 132 is sealingly connected to the decorative ring 120 through the sealing member. In addition, a sealing member may be further provided between the mounting lug boss 132 and each of the top corners of the base 111 of the camera 110, so that the mounting lug boss 132 is sealingly connected to the top corner of the base 111 of the camera 110 through the sealing member. In this way, the mounting lug boss 132 can provide double-sided sealing for the decorative ring 120 and the camera 110.

After the mounting lug boss 132 seals the top corners of the base 111 of the camera 110, the skirt 122 can cover the side of the mounting lug boss 132. In addition, due to the fact that the avoidance space 123 is provided correspondingly to the top corner of the base 111 of the camera 110, a sealing thickness at the top corner of the base 111 of the camera 110 does not increase, meaning that an overall thickness of the electronic device does not increase while satisfying double-layer sealing for the camera 110. This is convenient for the thinning of the electronic device.

The cover plate 130 may be a rectangular structure corresponding to the base 111 of the camera 110. Specifically, an outer contour of the plate body 131 is rectangular.

Further, the cover plate 130 may further include a plurality of mounting notches 133 provided between the mounting lug boss 132 and the plate body 131, and the skirt 122 is inserted into the mounting notches 133.

The bottom of the mounting lug boss 132 is connected to an edge of the plate body 131, where the mounting notches 133 are provided in a connection area, and the skirt 122 is inserted in the mounting notches 133.

In some embodiments, the strip edge 1221 of the skirt 122 may include a first extension portion extending from the frame body 121 in a direction towards the camera 110 and a second extension portion extending outwardly from an end of the first extension portion. The second extension portion is disposed parallel to the plate body 131.

The mounting notches 133 are provided on a side of the cover plate 130 facing the decorative ring 120, so that the second extension portion of the skirt 122 is inserted into the mounting notches 133. In this way, the second extension portion abuts against notch bases of the mounting notches 133 when the frame body 121 abuts against the cover plate 130, to restrict a mounting position of the decorative ring 120 on the cover plate 130, and to improve a degree of mutual coordination of various structures in an internal space of a product.

The number of mounting notches 133 may be equal to a number of skirts 122. The plurality of mounting notches 133 are disposed in one-to-one correspondence with the plurality of strip edges 1221 of the skirts 122.

Figure 4:
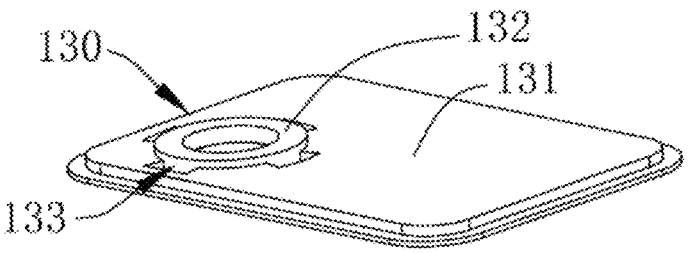
FIG. 4 is a schematic diagram of a structure of a cover plate in an embodiment of an electronic device according to this application.

Further, as shown in FIG. 1, the mounting lug boss 132 is located on a side of the plate body 131 close to the decorative ring 120; or as shown in FIG. 4, a surface of the mounting lug boss 132 close to the decorative ring 120 is flush with a surface of the plate body 131 close to the decorative ring 120.

In this embodiment, the mounting lug boss 132 is connected to the plate body 131 through an extension band, and a height between the mounting lug boss 132 and the plate body 131 can be adjusted depending on an actual situation. For example, the mounting lug boss 132 may be located on a side of the plate body 131 close to the camera 110. To be specific, the extension band extends in a direction from the edge of the plate body 131 to the camera 110 to support the mounting lug boss 132. To reduce an overall thickness of the cover plate 130, the mounting lug boss 132 is disposed on the side of the plate body 131 close to the decorative ring 120, so that the cover plate 130 can be thinned, a weight can be reduced, and the electronic device can be made thinner and lighter. The cover plate 130 is able to seal the base 111 of the camera 110 in an extremely thin case without increasing an outer diameter of the decorative ring 120, ensuring an appearance requirement.

For another example, the surface of the mounting lug boss 132 close to the decorative ring 120 is flush with the surface of the plate body 131 close to the decorative ring 120. In other words, the extension strip extends in a direction parallel to, or recessed in, the plate body 131, to connect to the mounting lug boss 132. In this way, the thickness of the cover plate 130 can be satisfied, allowing the cover plate 130 to be provided with larger notches to match a larger base 111 of the camera 110.

Figure 5:
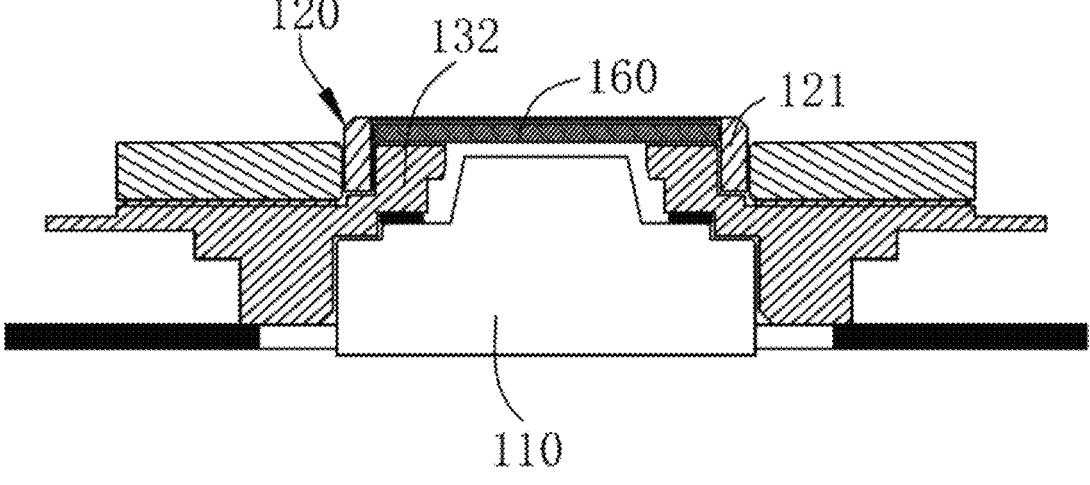
FIG. 5 is another partial sectional view of an embodiment of an electronic device according to this application.

Further, as shown in FIG. 3 and FIG. 5, the base 111 of the camera 110 is of a rectangular body structure, four top corners of the base 111 are each provided with a notch, and notch bases of the notches are connected to the bottom of the mounting lug boss 132.

In this embodiment, the notches are provided at the four top corners of the base 111 of the camera 110, and a shape of the mounting lug boss 132 at positions corresponding to the notches can be designed to match the notches at the top corners of the base 111, so that no space is left between the top corners of the base 111 of the camera 110 and the mounting lug boss 132 of the cover plate 130, as shown in FIG. 5. The shape of the mounting lug boss 132 at the positions corresponding to the notches may alternatively be designed as a platform. In this case, the mounting lug boss 132 is sealingly connected to a notch wall top of the notch at each of the top corners of the base 111 through a sealing member, as shown in FIG. 3.

When no notch is provided at the top corners of the base 111 of the camera 110, an inner diameter of the frame body 121 is at least larger than a diagonal size of the base 111 of the camera 110. After notches are provided at the top corners of the base 111 of the camera 110, the inner diameter of the frame body 121 is at least larger than a diagonal size of a notch top of the base 111 of the camera 110. Therefore, a requirement for the inner diameter of the frame body 121 can be reduced by providing the notches at the top corners of the base 111 of the camera 110, thereby facilitating miniaturization of the decorative ring 120.

Figure 6:
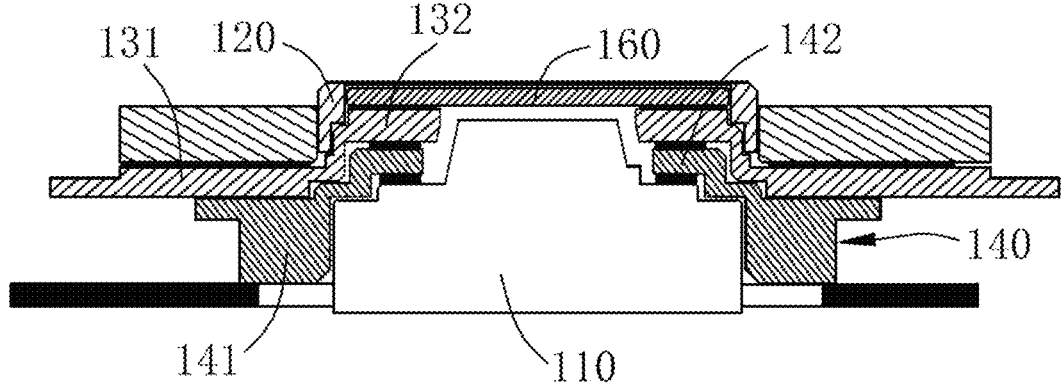
FIG. 6 is another partial sectional view of an embodiment of an electronic device according to this application.
Figure 7:
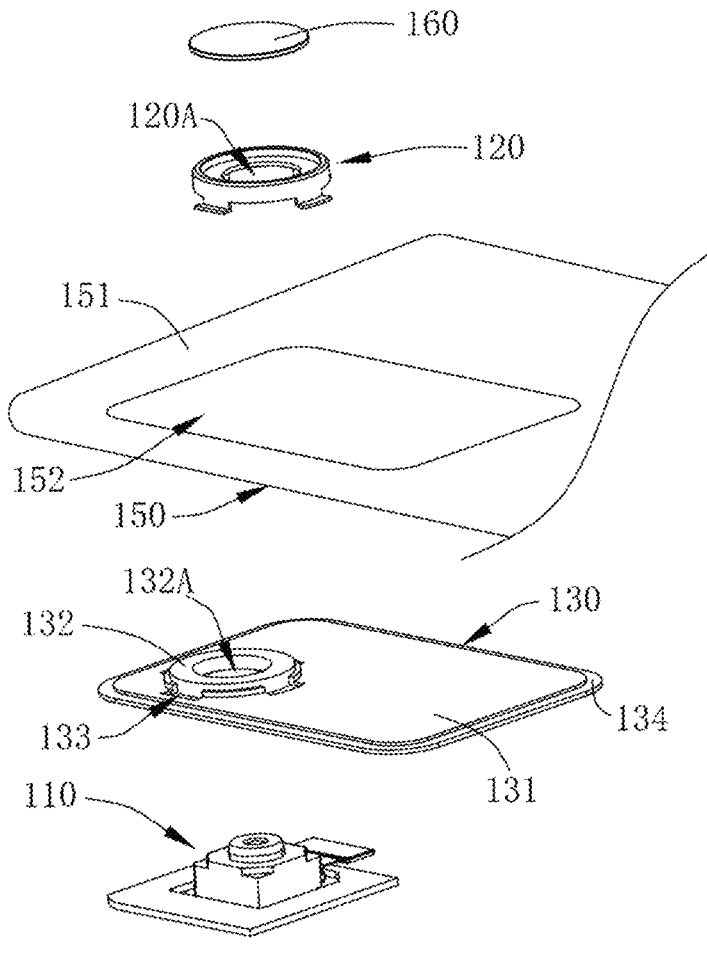
FIG. 7 is a schematic diagram of a partial stereoscopic structure in an embodiment of an electronic device according to this application.
Figure 8:
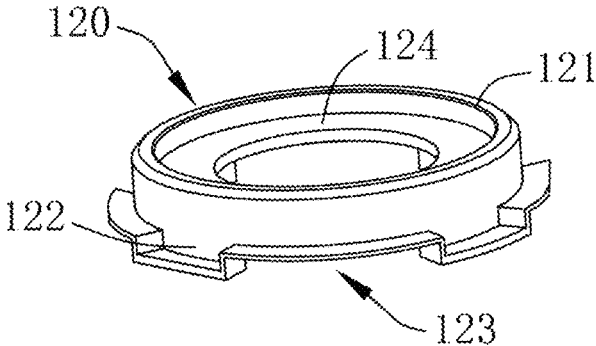
FIG. 8 is another schematic diagram of a structure of a decorative ring in an embodiment of an electronic device according to this application.

Further, as shown in FIG. 6, a motherboard support 140 is further included, where the motherboard support 140 includes a support body 141 and a sealing lug boss 142 connected to the support body 141, a third through hole is provided in the sealing lug boss 142, and the third through hole is in communication with the second through hole 132A.

The sealing lug boss 142 is sandwiched between the mounting lug boss 132 and each of the top corners of the base 111 of the camera 110 through a sealing member, and the notch bases of the notches are connected to the bottom of the sealing lug boss 142.

In this embodiment, the camera 110 is sealed by adding the motherboard support 140 to a side of the cover plate 130 close to the camera 110. The camera lens 112 of the camera 110 is inserted into the third through hole 143 disposed on the sealing lug boss 142.

The cover plate 130 or the motherboard support 140 can cover the camera 110 in all directions, to prevent a hole from exposing the top corner of the base 111 of the camera 110, and to prevent the camera 110 from a risk of static electricity.

In the embodiments of this application, the mentioned sealing members may all include sealing foam or may be made of other sealing materials, which is not limited herein.

Further, the electronic device further includes a battery cover 150, where the battery cover 150 includes a cover body 151 and a decorative hole 152 that passes through the cover body 151. The cover plate 130 further includes a cover plate skirt 134 extending outwardly from an edge of the plate body 131, the cover plate skirt 134 is in communication with an edge of the decorative hole 152, and the decorative ring 120 is located in the decorative hole 152.

The battery cover 150 may be provided with the decorative hole 152 of a shape corresponding to that of the rectangular plate body 131, and the cover plate 130 is secured, through the cover plate skirt 134 on the edge of the plate body 131, to the edge of the decorative hole 152 of the battery cover 150 close to a surface the camera 110, and the camera 110, the mounting lug boss 132, the sealing lug boss 142, and the decorative ring 120 are all disposed in the decorative hole 152.

Further, as shown in FIG. 3, the electronic device further includes a lens 160.

The decorative ring 120 may further include a supporting table 124 extending inwardly from the frame body 121 to form the first through hole 120A, and the supporting table 124 carries the lens 160 to allow the lens 160 to cover a viewing angle of the camera lens 112.

The supporting table 124 extends inwardly from the frame body 121 to form an annular structure having the first through hole 120A. The supporting table 124 is configured to carry the lens 160, while an inner wall of the frame body 121 is capable of abutting against an edge of the lens 160 to restrict the lens 160 and prevent the lens 160 from falling out.

The lens 160 is made of a transparent material, and is capable of protecting the camera lens 112 by preventing direct external impact on the camera lens 112, without affecting viewing of the camera lens 112. Specifically, the lens 160 can be made of a hard glass material.

A center of the camera lens 112 of the camera 110 is located on a central axis of the first through hole 120A, and an area of the first through hole 120A is larger than an area of a viewfinder of the camera lens 112 of the camera 110.

A surface of the supporting table 124 close to the camera 110 abuts against a top surface of the mounting lug boss 132. Specifically, the supporting table 124 can be attached to the top surface of the mounting lug boss 132 with a back adhesive, so as to implement sealing between the supporting table 124 and the cover plate 130.

In some other embodiments, the decorative ring 120 may alternatively be provided with no supporting table 124, where the lens 160 is supported by the mounting lug boss 132 located in the frame body 121. As shown in FIG. 5 and FIG. 6, the top surface of the mounting lug boss 132 abuts against the lens 160 to support the lens 160.

Further, a top surface of the lens 160 may be flush with a top surface of the frame body 121, so as to improve aesthetics of the electronic device.

Further, the decorative ring 120 further includes a first edge extending from an edge of the skirt 122 in a direction perpendicular to the skirt 122 and a second edge extending from the bottom of the frame body 121 in a direction perpendicular to the outer wall of the frame body 121. The first edge and the second edge are integrally molded to form an upper-lower step structure.

A space directly opposite the second edge is an avoidance space of the skirt 122, and also is a space between an upper step and two adjacent lower steps in the step structure. The top corners of the base 111 of the camera 110 are disposed correspondingly to the second edge, so that the fitting height between the camera 110 and the decorative ring 120 can be reduced and the internal space of the electronic device 100 is optimized, thereby facilitating the thinning of the electronic device 100.

In the embodiments of this application, "up" and "top" refer to a direction away from the camera, and "down" and "bottom" refer to a direction close to the camera.

The electronic device provided in the embodiments of this application, with the assistance of the skirt 122, further has the following advantages in a case that the decorative ring 120 can satisfy a smaller outer diameter size of the frame body 121:

1. It can avoid the decorative ring 120 enlarging and thus prevent the distance between the decorative ring 120 and the battery cover 150 from being decreased, so as to ensure structural strength of an edge of the battery cover 150 and improve safety of the electronic device.
2. It can avoid the decorative ring 120 enlarging and thus prevent the gap between the decorative ring 120 and the battery from being too small, so as to prevent static electricity from affecting the camera 110 while ensuring safety of the battery.
3. It can avoid the decorative ring 120 enlarging and compressing an antenna headroom area of a frame of the electronic device, so as to ensure that antenna performance is guaranteed.
4. The flexible arrangement of the camera module allows for arranging the camera 110 as close to the edge of the electronic device 100 as possible. This concentrated arrangement of components on the motherboard optimizes component arrangement on the motherboard.

The electronic device according to the embodiments of this application may be any electronic device suitable for including a sensor package structure, such as a mobile phone, a laptop, a tablet computer, or a wearable device.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . ." does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

The foregoing describes embodiments of this application in combination with the accompanying drawings, but this application is not limited to the foregoing specific implementations. The foregoing specific implementations are merely schematic rather than restrictive. Those of ordinary skill in the art can make many forms under the inspiration of this application, without departing from a tenet of this application and the scope protected by the claims, all of which belong to the protection scope of this application.

What is claimed is:

1. An electronic device, comprising:

a camera comprising a base and a camera lens disposed at the top of the base; and a circular trim comprising a frame body and a skirt, wherein the skirt is disposed on an outer wall of the frame body and extends from the frame body in a direction away from the frame body; a first through hole is provided in the frame body, the camera faces the first through hole, and at least part of the camera lens is located in the first through hole; and the skirt has an avoidance space, the avoidance space is disposed in relation to top corners of the base, and at least part of the top corner is disposed in the avoidance space;

further comprising a cover plate, wherein the cover plate comprises a plate body and a mounting lug boss connected to the plate body, a second through hole is provided in the mounting lug boss, and the first through hole is in communication with the second through hole; and the circular trim covers the mounting lug boss, and the mounting lug boss is sealingly connected to the top corner of the base through the avoidance space;

wherein the base of the camera is of a rectangular body structure, four top corners of the base are each provided with a notch, and notch bases of the notches are connected to the bottom of the mounting lug boss.

2. The electronic device according to claim 1, wherein the skirt comprises a plurality of strip edges, the plurality of strip edges are spaced apart from each other, and two adjacent strip edges have the avoidance space.

3. The electronic device according to claim 1, wherein the cover plate further comprises a plurality of mounting notches provided between the mounting lug boss and the plate body, and the skirt is inserted into the mounting notches.

4. The electronic device according to claim 1, wherein the mounting lug boss is located on a side of the plate body close to the circular trim; or a surface of the mounting lug boss close to the circular trim is flush with a surface of the plate body close to the circular trim.

5. The electronic device according to claim 1, further comprising a motherboard support, wherein the motherboard support comprises a support body and a sealing lug boss connected to the support body, a third through hole is provided in the sealing lug boss, and the third through hole is in communication with the second through hole; and the sealing lug boss is sandwiched between the mounting lug boss and each of the top corners of the base of the camera through a sealing member, and the notch bases of the notches are connected to the bottom of the sealing lug boss.

6. The electronic device according to claim 5, wherein the sealing member comprises sealing foam.

7. The electronic device according to claim 1, further comprising a battery cover, wherein the battery cover comprises a cover body and a decorative hole that passes through the cover body; and the cover plate further comprises a cover plate skirt extending outwardly from an edge of the plate body, the cover plate skirt is connected to an edge of the decorative hole, and the circular trim is located in the decorative hole.

8. The electronic device according to claim 1, further comprising a lens, wherein the circular trim further comprises a supporting table extending inwardly from the frame body to form the first through hole, and the supporting table carries the lens to allow the lens to cover a viewing angle of the camera lens.

* * * * *